United States Patent
Gold

(10) Patent No.: US 9,779,362 B1
(45) Date of Patent: Oct. 3, 2017

(54) RANKING VIDEO DELIVERY PROBLEMS

(71) Applicant: Google Inc., Mountain View, CA (US)

(72) Inventor: Kevin Gold, Somerville, MA (US)

(73) Assignee: GOOGLE INC., Mountain View, CA (US)

( * ) Notice: Subject to any disclaimer, the term of this patent is extended or adjusted under 35 U.S.C. 154(b) by 429 days.

(21) Appl. No.: 14/467,955

(22) Filed: Aug. 25, 2014

(51) Int. Cl.
  G06F 17/30 (2006.01)
  G06N 99/00 (2010.01)
  G06N 7/00 (2006.01)
  H04L 29/06 (2006.01)

(52) U.S. Cl.
  CPC ..... G06N 99/005 (2013.01); G06F 17/30784 (2013.01); G06N 7/00 (2013.01); H04L 65/60 (2013.01); H04L 67/42 (2013.01)

(58) Field of Classification Search
  CPC ........ G06N 99/005; G06N 7/00; H04L 65/60; H04L 67/42
  See application file for complete search history.

(56) References Cited

U.S. PATENT DOCUMENTS

| | | | | |
|---|---|---|---|---|
| 7,490,073 B1* | 2/2009 | Qureshi | ................. | G06N 5/048 706/50 |
| 2003/0236906 A1* | 12/2003 | Klemets | .................... | H04N 5/76 709/231 |
| 2013/0159498 A1* | 6/2013 | Funge | ..................... | H04L 65/80 709/224 |
| 2014/0033242 A1* | 1/2014 | Rao | ...................... | H04N 21/442 725/14 |

* cited by examiner

Primary Examiner — Stanley K Hill
Assistant Examiner — Tsu-Chang Lee
(74) Attorney, Agent, or Firm — Young Basile Hanlon & MacFarlane, P.C.

(57) ABSTRACT

Systems and methods for determining video infrastructure delivery problems using machine learning are presented. In an aspect, a system includes a reception component configured to receive information regarding videos streamed by the system to devices, wherein the information identifies video playback events at the devices and re-buffer events respectively associated with the video playback events. The system further includes a quality component configured to identify features related to quality of the playback events at the devices based on the information, and an analysis component configured to determine probabilities of occurrence of the re-buffer events based on different combinations of the features, and determine weighted values for each of the features that reflect their contribution to the probabilities of occurrence of the re-buffer events based on the different combinations of the features.

17 Claims, 10 Drawing Sheets

Show the effect of changing rack type ▾ on ASN ▾.

Estimating impact on playbacks of the whole world ▾.

Counts below are playbacks per day. The Saved column shows the estimated number of rebuffers that can be eliminated if the change is made.

Show Raw Query

| asn | Changing | From | To | Playbacks | Rebuffer Playbacks | Rebuf % | New Rebuf % | Saved |
|---|---|---|---|---|---|---|---|---|
| 146 | rack_type | EC | XT | 14,649,603 | 2,385,423 | 16.28% | 10.40% | 861,829 |
| 788 | rack_type | EC | XP | 14,098,978 | 2,837,280 | 20.12% | 14.38% | 810,400 |
| 987 | rack_type | XT | XP | 12,943,920 | 4,944,418 | 38.20% | 32.46% | 742,247 |
| 119 | rack_type | EC | XT | 21,135,137 | 1,966,198 | 9.30% | 5.93% | 712,490 |
| 556 | rack_type | EC | XP | 27,603,685 | 2,364,559 | 8.57% | 6.11% | 677,308 |
| 9871 | rack_type | EC | XP | 41,186,696 | 3,226,930 | 7.84% | 6.21% | 669,214 |
| 146 | rack_type | XP | XT | 3,564,327 | 1,545,892 | 43.37% | 29.49% | 494,761 |
| 156 | rack_type | XT | XP | 4,439,901 | 1,171,643 | 26.39% | 15.53% | 482,160 |
| 3321 | rack_type | EC | XT | 5,488,645 | 1,233,180 | 22.47% | 14.58% | 432,978 |
| 45 | rack_type | EC | XP | 2,087,610 | 765,223 | 36.66% | 16.14% | 428,320 |
| 4765 | rack_type | EC | XP | 5,508,624 | 2,194,552 | 39.69% | 34.01% | 313,996 |
| 224 | rack_type | XT | XP | 27,127,103 | 2,695,068 | 9.93% | 9.02% | 259,311 |
| 1789 | rack_type | EC | XP | 1,451,779 | 415,389 | 28.61% | 12.62% | 232,117 |

FIG. 5

RANKING VIDEO DELIVERY PROBLEMS

TECHNICAL FIELD

This application generally relates to systems and methods for ranking video delivery problems using machine learning techniques.

BACKGROUND

Online streaming videos have become a popular medium of communication for business, education, social and entertainment purposes. These videos can be accessed and viewed over the Internet in on-demand and in a live video streaming capacity. As a result, users can appreciate instantaneous watching where they need not wait for long periods of time to download a video. Rapid growth in the deployment and usage of the Internet during recent years has led to exponential increase in network traffic. This increase in traffic leads to network congestion and packet loss. With respect to video streaming, increase in network traffic results in volatile performance of the media streaming service, ultimately degrading the quality of the playback experience for the user due to longer initial buffering times and re-buffering events due to poor network conditions and congested media streaming servers.

With high traffic Internet based media streaming systems (e.g., millions to billions of videos per day to different types of clients located worldwide), packets can traverse numerous routers from source to destination and delays can be introduced at any juncture. Tools for discovering causes of interruption in streaming media playback that lead to re-buffering and mechanisms to mitigate re-buffering are lacking given the sheer quantity of data and the number variables involved.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 5 presents another example user interface for evaluating streaming video delivery problems in accordance with various aspects and embodiments described herein;

DETAILED DESCRIPTION

Figure 1:
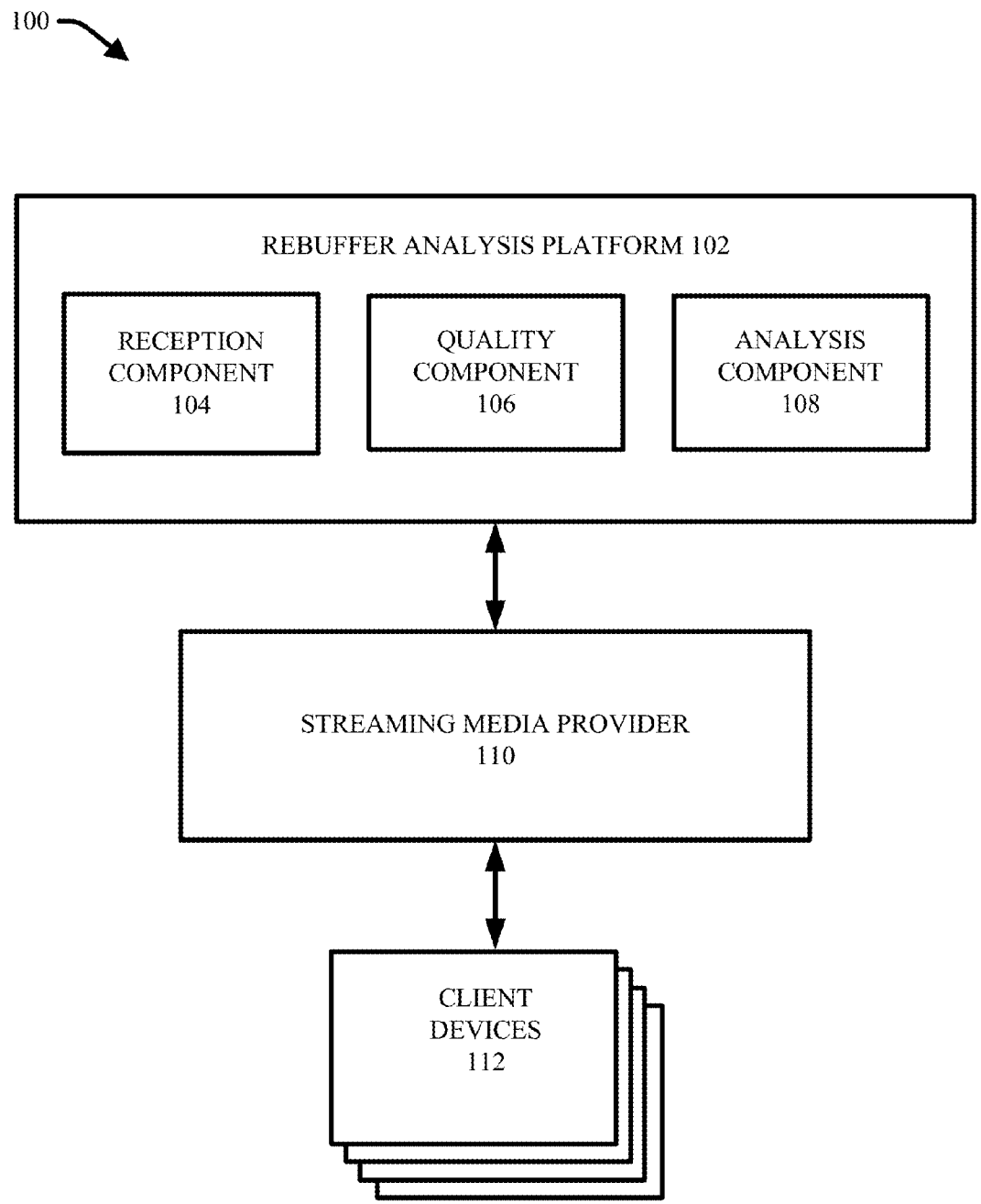
FIG. 1 illustrates an example system for evaluating streaming video delivery problems in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for identifying and evaluating streaming media delivery issues that contribute to re-buffering. Buffering is a process by which data is temporarily loaded into a reserved area of memory (e.g., a buffer) before being sent to another location. With respect to streaming media (e.g., audio or video) over a wireless network (e.g., the Internet), buffering refers to downloading a certain amount of the media from the media streaming provider at the client before playing the media at the client. Having an advance supply of segments of the media at the client facilitates smooth playback in the event there are momentary delays in transmission while the media is being played.

If a network is fast enough to keep up with playback, buffering is not necessary. However, this is generally not the case with streaming media over the Internet where packets can traverse numerous routers from source to destination and delays can be introduced at any juncture. In the event of such delays, the pre-loaded media content can continue to play until the network catches up. However, where amount of delay exceeds the amount of pre-loaded content, playback of the media will pause until enough data is buffered again to continue playback. The buffering of media content following an interruption in playback prior to continuing playback is referred to herein as a re-buffering or a re-buffer event.

Tools for discovering causes for interruption in streaming media playback that lead to re-buffer events and mechanisms to mitigate these re-buffer events are lacking given the sheer quantity of data and the number variables involved in re-buffer events associated with a high traffic (e.g., millions to billions of videos per day to different types of clients located worldwide) Internet based streaming media system. The subject disclosure provides a mechanism that tackles these obstacles by employing an automated machine learning based approach for identifying and evaluating problems associated with re-buffer events in such a streaming media system. In particular, large amounts of data regarding a plurality of media streaming playback events (e.g., thousands to millions to billions, etc., of playback events) served by a streaming media provider are gathered from both the server and client ends.

For example, for each playback event client side information can including but is not limited to: count of re-buffer events encountered while playing a video, length of time that the video was watched, type of operating system of the client device, type of client device, and a unique identifier for the playback event. The unique identifier for the playback event can be used to match-up reported/gathered client side information with the server-side logs having information associated with the playback event. In an aspect, this server side information can include but is not limited to: internet protocol (IP) address served in association with the playback event, internet service provider (ISP), rack serving the media and type of the rack, protocols used, media format used, and other similar information.

In an aspect, the gathered playback information is first processed to generate a large table that relates quality information for each playback event/experience. This table is employed to identify features contributing to re-buffer events respectively associated with the playback events. For example, a MapReduce procedure can run over this table to calculate the number of playbacks and probability of re-buffer associated with the playbacks for each combination of features that influence quality. These features are then analyzed using a machine learning technique to determine weighted values representative of their respective contribution to causation of re-buffer. Based on their weighted values, changes to these features (e.g., changing a rack type from A to B for mobile device playbacks server by ISP #2981) are analyzed and ranked based on number of playbacks that could be predicatively improved (e.g., based on minimization of re-buffer events associated therewith) if the changes were implemented. Those changes that contribute to a greater amount of reduced re-buffer events are ranked higher than those changes to that have a smaller impact on reduction of re-buffer events. Those changes ranked relatively high (e.g., above a ranking threshold) can be suggested for deployment.

In one or more aspects, a system is provided that includes a reception component configured to receive information regarding videos streamed by the system to devices, wherein the information identifies video playback events at the devices and re-buffer events respectively associated with the video playback events. The system further includes a quality component configured to identify features related to quality of the playback events at the devices based on the information, and an analysis component configured to determine probabilities of occurrence of the re-buffer events based on different combinations of the features, and determine weighted values for each of the features that reflect their contribution to the probabilities of occurrence of the re-buffer events based on the different combinations of the features.

In another aspect, a method is disclosed that includes using a processor to execute the following computer executable instructions stored in a memory to perform acts including receiving playback information regarding quality of playback of videos streamed by the system to devices, wherein the playback information identifies video playback events at the devices and re-buffer events respectively associated with the video playback events. The method further includes identifying features related to the quality of playback of the videos, determining probabilities of occurrence of the re-buffer events based on different combinations of the features, and determining weighted values for each of the features that reflect their contribution to the probabilities of occurrence of the re-buffer events based on the different combinations of the features.

Further provided is a tangible computer-readable storage medium comprising computer-readable instructions that, in response to execution, cause a computing system to perform various operations. These operations include receiving playback information regarding quality of playback of videos streamed by the system to devices, wherein the playback information identifies video playback events at the devices and re-buffer events respectively associated with the video playback events. The operations further include identifying features related to the quality of playback of the videos, determining probabilities of occurrence of the re-buffer events based on different combinations of the features, and determining weighted values for each of the features that reflect their contribution to the probabilities of occurrence of the re-buffer events based on the different combinations of the features.

Referring now to the drawings, with reference initially to FIG. 1, presented is diagram of an example system 100 for identifying and evaluating streaming media delivery issues that contribute to re-buffering, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes buffer analysis platform 102, streaming media provider 110, and a plurality of client devices 112. Streaming media provider 110 can include an entity configured to provide streaming media (e.g., video or audio) to client devices 112 via a network (e.g., the Internet). Re-buffer analysis platform 102 is configured to facilitate identifying and evaluating streaming media delivery issues associated with streaming media provider 110 that contribute to re-buffering. Generally, re-buffer analysis platform 102, streaming media provider 110 and client devices 112 can include memory that stores computer executable components and a processor that executes the computer executable components stored in the memory, examples of which can be found with reference to FIG. 10.

The various components of system 100 can be connected either directly or via one or more networks, (not shown). Such network(s) can include wired and wireless networks, including but not limited to, a cellular network, a wide area network (WAD, e.g., the Internet), a local area network (LAN), or a personal area network (PAN). For example, client devices 112 can communicate with streaming media provider 110 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks. Further, it is to be appreciated that although buffer analysis platform 102 is illustrated as being a component external to streaming media provider 110, such implementation is not so limited. For example, buffer analysis platform 102 (and/or one or more components of buffer analysis platform 102) can be included at streaming media provider 110, another content server/system, and/or the cloud.

Client devices 112 can include any suitable computing device configured to interact with streaming media provider 110 to receive and play streaming media provided thereby. For example, a client device 112 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 112.

Streaming media provider 110 can include an entity that provides streaming media content (e.g., streaming video or audio, live streaming video or audio, etc.) to client devices 112 via a network (e.g., the Internet). For example, streaming media provider 110 can include a media sharing system that has access to a voluminous quantity (and potentially an inexhaustible number) of shared media (e.g., video and/or audio) files. The media sharing system can further stream these media files to one or more users at respective client devices 112 as accessed at networked platform of the media sharing system (e.g., a website or client side application). Streaming media provider 110 can employ one or more networked computing devices to store, process and deliver on-demand and/or live streaming media content to client devices 112. The media content can be stored in memory associated with streaming media provider 110 and/or at various networked devices employed by streaming media provider 110.

In an exemplary embodiment, streaming media provider 110 can include a large scale content provider configured to distribute high volumes of streaming media to a plurality of clients over a large geographic region (e.g., a country, a continent, the world, etc.). According to this embodiment, streaming media provider 110 can employ a large scale distributed content delivery network (CDN) to meet and serve growing user demands. A CDN is a collection of servers distributed across multiple locations to more efficiently deliver content including applications, media streams or software to clients. In order to maximize access to the requested resource, the server with the fastest response time is chosen. Generally this is the server within closest proximity to the requesting client device and having sufficient bandwidth. CDNs effectively shorten the users' startup delays, reduces the traffic imposed on the network, and serves more users as a whole.

The ability for streaming media provider 110 to stream video and/or audio at a particular quality-level without re-buffering is an end-to-end measure of the quality of the streaming media provider's particular CDN path to the requesting client device 112 versus peak throughput on the access network employed by the requesting client device 112. A variety of factors associated with streaming media provider's 110 CDN and related network layers, as well as the particular media streaming protocol employed by streaming media provider 110 can influence quality of playback at the client device 112.

For example, streaming media provider 110 can employ an expansive CDN where operation of plurality of integrated hardware and software components can affect playback quality at the client device 112. In particular, streaming media provider 110 can employ a CDN having a multi-layered logical organization of several data centers providing distributed media servers located in different geographical sites, and connected to one or multiple ISPs at the nearby major Internet "interconnection regions" or points-of-presence (PoPs). For example, the CDN employed by streaming media provider 110 can set up dedicated domain name system (DNS) servers in its domain. These DNS servers can evaluate the IP address of a requesting clients' DNS resolver to select a suitable one of its servers, factoring in geographical closeness, costs, load, and/or other factors. According to this example, media content serviced by streaming media provider 110 can flow from one of its data centers through one of these PoPs to enter these ISPs, and is then carried to eventually reach various requesting client devices 112 via the local access networks employed by the client devices. The CDN can further replicate content to a plurality of distributed caches in relative closeness to or even inside of access networks of the ISPs to facilitate maximizing content delivery efficiency and quality. These caches can operate in accordance with a tiered physical cache hierarchy to store and provide media content based in part on popularity and anticipated demand.

In accordance with the above described exemplary media streaming CDN architecture, packets can traverse numerous routers from source to destination and delays can be introduced at any juncture. Therefore, the ability for streaming media provider 110 to stream a video at a particular quality-level without re-buffering can vary as a function of CDN performance and capability. A variety of other factors can affect the ability for streaming media provider 110 to stream media at a particular quality-level without re-buffering. For example, playback quality can vary as a function of content popularity, time of day, and/or performance and capabilities of the ISP network served.

In addition, client device capabilities and media resolution demands factor into the quality of playback at the client device 112. For example, a video session with good quality requires high bandwidth. In accordance with current video compression technology, a video format with a resolution of 360p requires a bit-rate of 500 Kbps, a video format with a resolution of 480p requires a bit-rate of 1 Mbps, a video format with a resolution of 720p requires a bit-rate of 2 Mbps, and a video format with a resolution of 1080p requires a bit-rate of 4 Mbps. Thus bandwidth capabilities at streaming media provider's CDN source servers can have a significant affect on playback quality, including the occurrence of re-buffer events associated with playback.

It is difficult to discover causes for interruption in streaming media playback that lead to re-buffer events given the number of variable associated with a large integrated and high traffic Internet based streaming media system that provides millions to billions of videos per day to different types of clients located worldwide, such as media streaming provider 110. As a result, tools for determining efficient and effective mechanisms to mitigate these re-buffer events are lacking. Re-buffer analysis platform 102 is configured to overcome these deficiencies by employing an automated machine learning based approach for identifying and evaluating problems associated with re-buffer events in such a streaming media system. To facilitate various aspects of operation, re-buffer platform 102 can include reception component 104, quality component 106 and analysis component 108.

Reception component 104 is configured to receive data from streaming media provider 110 regarding media playback events at respective client devices 112 serviced by streaming media provider 110. This information can include client side data and server side data. As used herein, a playback event refers to a streaming media session in which a media item is streamed from streaming media provider 110 to a client device 112 to effectuate playing of the streaming media item at the client device.

Client side data can include information received by streaming media provider 110 from respective client devices 112 (and/or video players employed by the respective client devices) reporting aspects associated with media playback experiences/events at the respective client devices 112. In an aspect, client side data can be received by streaming media provider 110 from a client device in response to requesting the information from the video player employed by the client device to play a media item in association with a playback event (e.g., pinging the client). In another aspect, client side data can be reported to streaming media provider 110 by respective client devices 112 in a continuous fashion after each playback experience. In yet another aspect, client side data can be reported to streaming media provider 110 by respective client devices 112 in the form of a routine report that identifies information associated with playback experiences that occurred over a predetermined period of time (e.g., daily, weekly, monthly, etc.).

In an aspect, for each playback event that occurs at a client device 112, the reported client side data can include but is not limited: number of re-buffer events associated with the playback event, re-buffer time associated with the respective re-buffer events, length of time a video was watched prior to and/or between occurrence of re-buffer events, type of the client device (e.g., mobile device, television, laptop PC, etc.), operating system of the client device, and type of client application (e.g., native application or browser) employed by the client device to access streaming media provider 110. In an aspect, each playback event reported by a client device 112 can include a unique identifier for the playback event (e.g., a client playback nonce or a client playback number (CPN)). This unique identifier can be employed by streaming media provider 110 and/or buffer analysis platform 102 to match up client-side reports with the server-side logs.

Server side data includes information internal to streaming media provider 110 associated with respective playback experiences at client devices 112. For example, for each playback event service by streaming media provider 110, the server side data can include but is not limited to: the internet protocol (IP) addresses that was served, the ISPs employed, the data center that served the video, the server (also referred to as the rack or rack server) that served the video, type of server/rack that served the video, delivery/communication protocols employed to retrieve and stream the media item, and date and time of the playback event. In an aspect, where the playback event involves a live video, the protocols can further include live transcoding schemes and system components employed. Server side information can also include information associated with the specific media item associated with a playback event. For example, where the playback event involves a video, server side information can include an identifier for the video, the format of the video, the resolution of the video, the length of the video, and/or popularity of the video.

It should be appreciated that the various features gathered in association with a playback event that may a role in quality of playback experience, and particularly re-buffering events, are not limited to those client and server features noted above. In particular, these features can vary based on the particular CDN employed by streaming media provider 112 and as various hardware and software elements of the network and client devices 112 advance.

A vast amount of playback information can be accumulated by streaming media provider 110 depending on the number of clients accessing streaming media provider 110 and playing media provided thereby. For example, streaming media provider 110 can stream millions of videos daily to millions of viewers around the world. In an aspect, to facilitate analyzing this massive amount of data, quality component 106 is configured to index the features associated with each playback. In particular, quality component 106 is configured to identify those features related to quality of playback experiences/events based on the information received by reception component 104 and generate an index or table with quality information about the respective playback experiences/events (for which information is received).

For example, quality component 106 can generate a table that relates each playback event monitored (over specific time period) with features related to the quality of the playback event (e.g., the client side and server side features discussed above). According to this example, a table generated by quality component 106 can identify a playback event, the number of re-buffer events associated with the playback event, duration of the re-buffer events, and/or a variety of other server and client side quality related features that may play a role in the occurrence and/or duration of the re-buffer events. In an aspect, quality component 106 employs a MapReduce to distribute processing and create this table associating each playback event evaluated with information related to quality of the playback event (e.g., re-buffer count) and various features that may contribute to the quality of the playback event.

Analysis component 108 is configured to employ this index or table to determine the degree to which these indexed features effect causation of re-buffer. In an aspect, analysis component 108 employs a MapReduce and runs over this table to calculate the number of playbacks and probability of re-buffer for each combination of features that may influence quality. In particular, for every subset or different combination of features that may influence causation of re-buffer events (e.g., IP address served, ISP served, server/rack type, video resolution, client device type, etc.), analysis component 108 can determine a total number of playback events and the re-buffer events respectively associated with the playback events. Analysis component 108 can then calculate a probability of occurrence of the re-buffer events. For example, analysis component 108 can calculate the number of playbacks associated with a particular ISP, serving rack type, delivery protocol, etc. Based on the number of re-buffer events associated with these playback events, analysis component 108 can determine a probability of re-buffer associated with this combination of features. Analysis component 108 can reiterate this process for each possible feature combination (e.g., using a MapReduce) to generate a set of data points that respectively map feature combinations to probabilities of re-buffer.

Based on these data points, analysis component 108 can determine weighted values for each of the features, and some feature combinations, that reflect their contribution to the probabilities of occurrence of the re-buffer events. In particular, analysis component 108 can employ machine learning techniques to analyze the entire set of data points to determine weighted values for each of the features respectively associated with the data points that reflect the degree to which the individual features influence the probabilities of re-buffer associated with the respective data points. Analysis component 108 can employ various distributed machine learning systems for solving for these weights. In an aspect, analysis component 108 can determine weights for some interesting combinations of features whose interaction impact re-buffer, such as the combination of ISP and serving rack type. The result is that for every feature (and/or feature combination) that may influence the probability of re-buffer, analysis component 108 determines a weight for the feature (and/or feature combination) that directly reflects its impact on re-buffer. In an aspect, analysis component 108 performs a distributed logistic regression against these data points to determine the weights for each of the features (and/or feature combinations). A logistic regression is like a linear regression, but used for probabilities; its linear weights are passed through a logistic function to get a number between 0 and 1. With these weights, re-buffer platform 102 can estimate the probability of re-buffer if the system were changed. To minimize error associated with the distributed logistic regression model and complexity of the model itself, analysis component 108 can employ regularization. In machine learning techniques, regularization can prevent overfitting by penalizing models with extreme parameter values. Specifically, it is trying to minimize a measure of error associated with the distributed logistic model (e.g., minimize a loss function or a weighted sum of the log loss), and the sum of all the weights in the model. This will force many weights to be 0. Regularization can facilitate more accurate predictive changes/improvements to probabilities of re-buffer if the system were changed.

Figure 2:
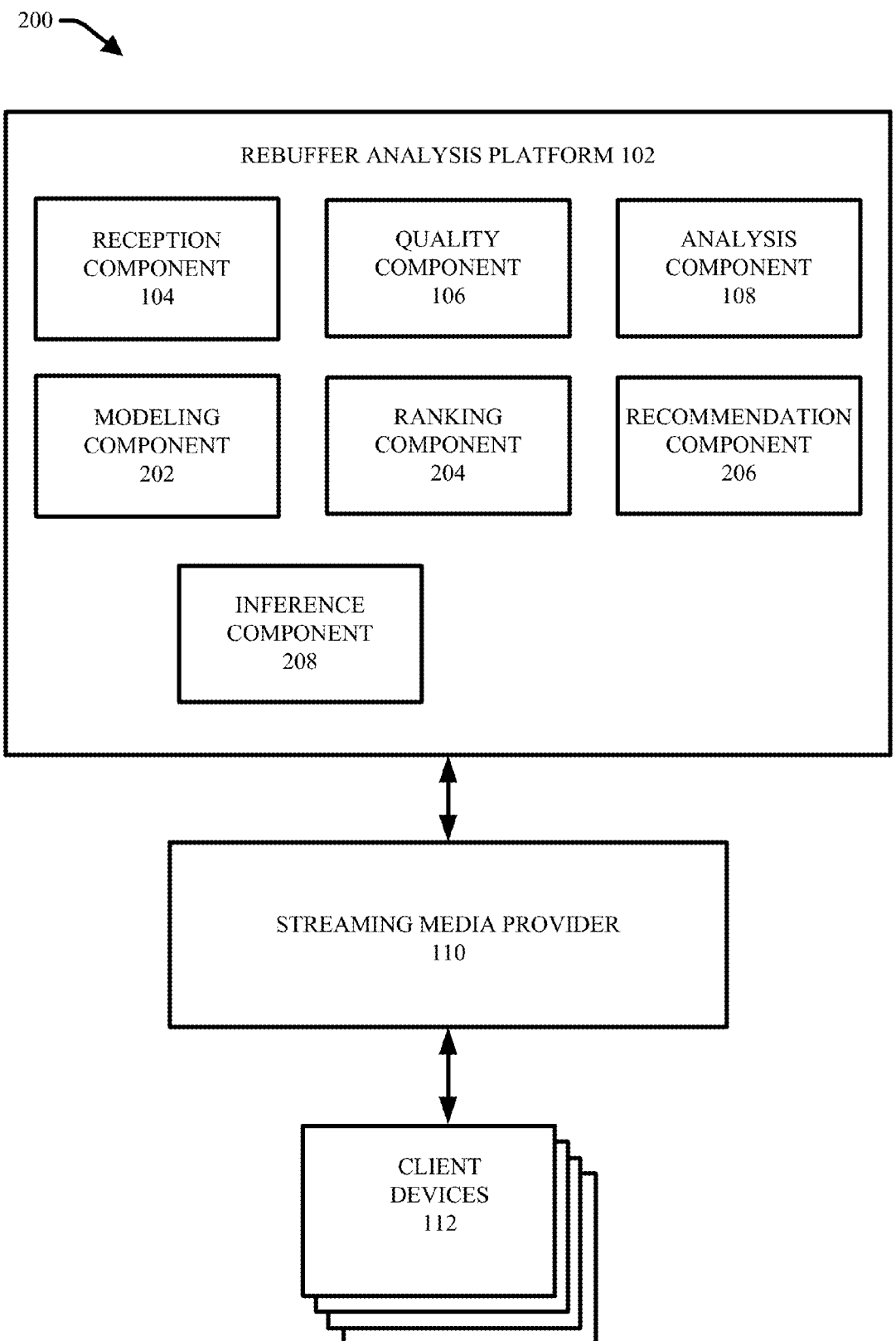
FIG. 2 illustrates another example system for evaluating streaming video delivery problems in accordance with various aspects and embodiments described herein.

FIG. 2 presents another example system 200 for identifying and evaluating streaming media delivery issues that contribute to re-buffering, in accordance with various aspects and embodiments described herein. System 200 includes same or similar component as system 100 with the addition of modeling component 202, ranking component 204, recommendation component 206, and inference component 208 to re-buffer platform 102. Repetitive description of like elements employed in respective embodiments of systems described herein is omitted for sake of brevity.

As discussed above, weights determined by analysis component 108 for the various features (and/or combinations of features) that reflect influence on the probability of re-buffer can be employed to estimate changes to the probability of re-buffer if aspects of the features were changed. Modeling component 202 is configured to evaluate the effects that changes to these features have on probabilities of occurrence of re-buffer events based on weighted values determined for each of the features. In particular, modeling component 202 can determine changes to the probability of re-buffer associated with a data point for in response to various changes to aspects or values of the features that constitute the data point. For example, using the weighted values for each of the features that make up a data point (wherein a data point corresponds to a subset of features and a probability of re-buffer based on the subset of features), modeling component 202 can iterate through the original data points and estimate the number of playbacks that could be saved if one feature were different about each data point. For example, for a data point corresponding to users of 3G cell phone service in Canada who talk to a specific edge cache node, modeling component can estimates the re-buffer probability if the phone service were 4G or WiFi instead, then if the ISP were different, then if the edge cache node was replaced with a cache within the ISP, etc.

In an aspect, modeling component 202 can determine the feature values corresponding to the lowest probability of re-buffer for each kind of feature and for each data point. In another aspect, modeling component 202 can restrict changes to aspects of the features associated with a data point to only those feature values that are already observed within an ISP. An exception to this restriction however involves cache deployments. In particular, re-buffering is generally minimized where a cache is provided in geographical proximity to the serving node. Accordingly, in an aspect, modeling component 202 can also analyze the effect of adding a cache to an ISP to an ISP that does not presently have one with respect to impact on re-buffer events associated with that ISP.

In association with evaluating changes to features or feature values associated with data points, modeling component 202 can generate a table that indexes each of the data points, possible changes to one or more feature of each the data points, and predicted probabilities of re-buffer associated with each of the data points with the changes applied. For example, modeling component 202 can generate a "change impact table" that relates how the probabilities of re-buffer for the original data points, (that respectively correspond to a particular combination of quality features), are impacted based on various changes to the features as a function of the respective weights associated with the features and feature changes.

This change impact table can be queried and ranked by any number of metrics. In an aspect, ranking component 204 is configured to rank possible changes to the data points based in part on the degree to which the changes reduce the original probability of re-buffer associated with the respective data points. For example, ranking component 204 can rank possible changes to feature values of the data points that have a greater impact on re-buffer higher than those changes which have a lower impact on re-buffer. In another aspect, ranking component 204 can rank possible changes to the data points based in part on the number of re-buffer events associated with the total playbacks for the original data point that could be reduced. In yet another aspect, ranking component 204 can rank possible changes to the data points based in part on number of the playbacks that could be saved or be relieved from re-buffer events (e.g., $(Pr\_2(\text{re-buffer})-Pr\_1(\text{re-buffer})) \times \text{total playbacks impacted})$. Ranking component 204 can rank the respective data points based on probabilities of re-buffer respectively associated therewith before and after application of the possible changes.

By ranking feature value changes based on effect on the probability of re-buffer and/or number of playbacks that could be saved, ranking component 204 pushes possible feature changes that are associated with low impact on re-buffering improvement to the bottom of the rankings. In addition, by employing regularization in association with determining weights for respective features using distributed logistic regression, many features will be associated with low values (e.g., zero). In an aspect, analysis component 108 can be configured to assume that regularization coefficients set to low values (e.g., zero) are not "true" components of the model fit. Thus analysis component 108 can be configured to not select feature values that are associated with low weights values. For example, analysis component 108 can be configured to not select feature values associated with a weight of zero, or a weight of W or below, where W is a number between 0 and 1. As a result, time spent on analyzing possible changes associated with low confidence of impact on re-buffer can be eliminated.

In addition to ranking based on effect on probability of re-buffer and/or number of playback that could be saved, ranking component 204 can also consider other factors when ranking possible changes to features associated with a data point. For example, ranking component 204 can consider feasibility issues associated with respective changes and impact a change to one feature for a data point would have on another data point.

In an aspect, the various effects changes to features of data points have on quality of playback (e.g., minimizing re-buffer events) can be analyzed and evaluated by a system operator. The operator can further choose, based on his or her analysis, what feature changes to move forward with implementing. In another aspect, system 200 can include recommendation component 206 to automatically provide recommended changes to features that effect re-buffering. For example, recommendation component 206 can recommend a subset of changes to features that are associated with a ranking (e.g., as applied by ranking component 204) above a threshold. For instance, recommendation component 206 can recommend changes to features associated with data points that are ranked among the top 10, top 20, top 50, etc., (e.g., where ranking is based on reduction of re-buffer probability, number of playbacks save, feasibility, etc.). In another aspect, recommendation component 206 can recommend changes based on measurement against a re-buffer probability reduction threshold or a number of saved playbacks threshold. For example, recommendation component 206 can recommend those feature changes that are attributable to greater than an X % reduction in re-buffer probability, where X is a number (e.g., 10%, 20%, 30%, etc.). In another example, recommendation component 206 can recommend changes to features that contribute to N or more saved playbacks.

Inference component 208 is configured to provide for or aid in various inferences or determinations associated with aspects of re-buffer analysis platform 102. For example, inference component 208 can facilitate quality component 106 with inferring what features to identify as contributing to quality of playback. In an aspect, inference component 208 can infer features which have a low confidence level of contributing to playback quality and then choose to ignore these features. In another example, inference component 208 can facilitate analysis component 108 by inferring weights to associate with quality features based on an inferred level of contribution to re-buffer probability. In another example, inference component 208 can infer how changes to various quality features would impact re-buffer based in part on the respective weights associated with the quality features. Inference component 208 can further facilitate recommendation component 206 with inferring changes to quality feature to recommend.

In aspect, all or portions of streaming media provider 110 can be operatively coupled to inference component 208. Moreover, inference component 208 can be granted access to all or portions of remote content sources, external information sources and client devices 112. In order to provide for or aid in the numerous inferences described herein, inference component 208 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various regression (explicitly and/or implicitly trained) schemes and/or systems (e.g., neural networks, expert systems, Bayesian belief networks, etc.) can be employed in connection with performing automatic and/or inferred action in connection with the claimed subject matter.

A regression model can map an input attribute vector, x=(x1, x2, x3, x4, xn), to a function f(x). Such a regression model can employ a probabilistic and/or statistical-based analysis (e.g., factoring into the analysis utilities and costs) to prognose or infer an action that a user desires to be automatically performed. A curve-fitting technique (e.g., a neural networks or simple least squares regression) is an example of a regression model that can be employed. Other directed and undirected regression model approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 3:
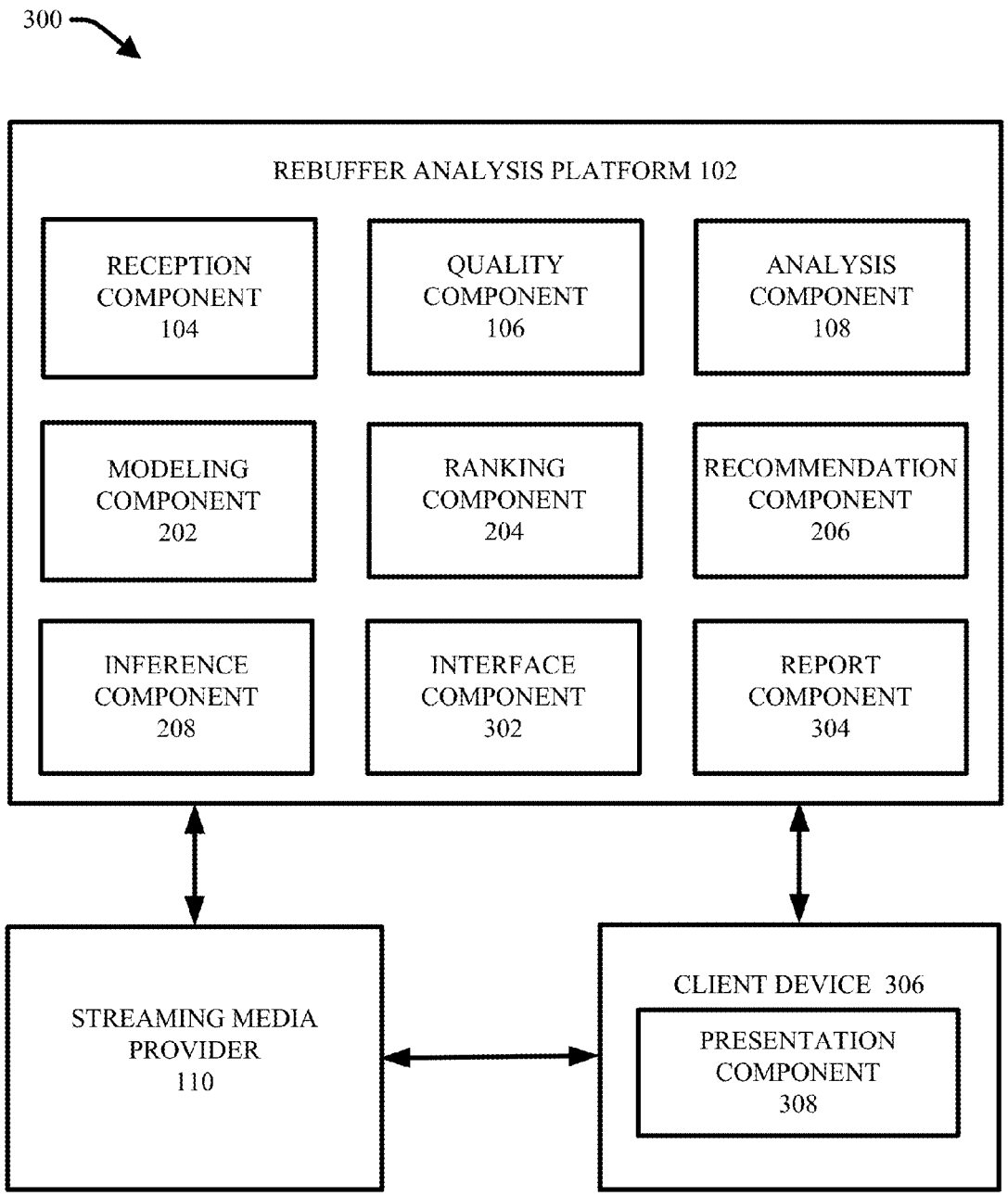
FIG. 3 illustrates another example system for evaluating streaming video delivery problems in accordance with various aspects and embodiments described herein.

FIG. 3 presents an example system 300 for evaluating streaming media delivery issues that contribute to re-buffering, in accordance with various aspects and embodiments described herein. System 300 can include same or similar components as system 200 with the addition of interface component 302 and report component 304 to re-buffer analysis platform 102. Repetitive description of like elements employed in respective embodiments of systems described herein is omitted for sake of brevity.

System 300 is depicted with a single client device 306 to facilitate description of the various features of interface component 302 and report component 304. It should be appreciated that client devices 112 are removed from system 300 merely to prevent confusion between the type of data interfacing features offered by re-buffer 102 platform to a user of a client device 306 and the type of data extraction employed by re-buffer platform 102 in association with client devices 112. However, client device 112 can include the functionality and features of client device 306, and vice versa.

The various components of system 300 can be connected either directly or via one or more networks, (not shown). Such network(s) can include wired and wireless networks, including but not limited to, a cellular network, a wide area network (WAD, e.g., the Internet), a local area network (LAN), or a personal area network (PAN). Further, it is to be appreciated that although buffer analysis platform 102 is illustrated as being a component external to streaming media provider 110 and client device 306, such implementation is not so limited. For example, buffer analysis platform 102 (and/or one or more components of buffer analysis platform 102) can be included at streaming media provider 110, client device 306, another content server/system, and/or the cloud.

Interface component 302 is configured to generate/configure a graphical user interface that facilitates querying data analyzed and processed by buffer analysis platform. Client device 302 can include presentation component 308 to generate/present a graphical user interface configured by interface component 302. In an aspect, presentation component 308 can include an application (e.g., a web browser) for retrieving, presenting and traversing information resources on the World Wide Web.

In particular, interface component 302 can generate/configure a graphical user interface that allows a user to query a change impact table generated by modeling component 202 that relates how the probabilities of re-buffer for the original data points, (that respectively correspond to a particular combination of features), are impacted based on various changes to the features as a function of the respective weights associated with the features and feature changes. For example, the graphical user interface can receive input that identifies a subset of data points corresponding to existing combinations of data points (e.g., users of 3G cell phone service in Canada who talk to a specific edge cache node) and requests information regarding re-buffer probabilities and/or playbacks impacted by re-buffer, associated with the data points. Report component 304 can then generate a query result or report that presents the data points as indexed with the requested information.

In addition, the graphical user interface can facilitate generating and viewing reports identifying potential impacts changes to the various data points can have on re-buffer probabilities, playbacks effected by re-buffer, network costs and/or other possible aspects of streaming media provider (e.g., viewer retention, overall quality of experience, user session duration, etc.). In particular, the graphical user interface can allow a user to query a change impact table to ask for particular kinds of changes to quality features, particular targets to those changes, or possible scopes of those changes (such as only changing playbacks within a particular ISP).

For example, for the subset of data points corresponding to users of 3G cell phone service in Canada who talk to a specific edge cache node, the graphical user interface can allow a user to request a report that evaluates how the re-buffer probability and/or playbacks impacted would change if the phone service were 4G or WiFi instead, then if the ISP were different, then if the edge cache node was replaced with a cache within the ISP, etc. In another example, via a graphical user interface generated by interface component 302, a user can request a report showing "top changes to features in the United States," or "a report showing the effect of changing rack type, video format, rack location, etc. on users of a particular ISP or a particular device type." In an aspect, a report generated by report component 304 in response to a requested query/report can rank possible changes based on the estimated number of playbacks that would not have re-buffers if the change were made.

Figure 4:
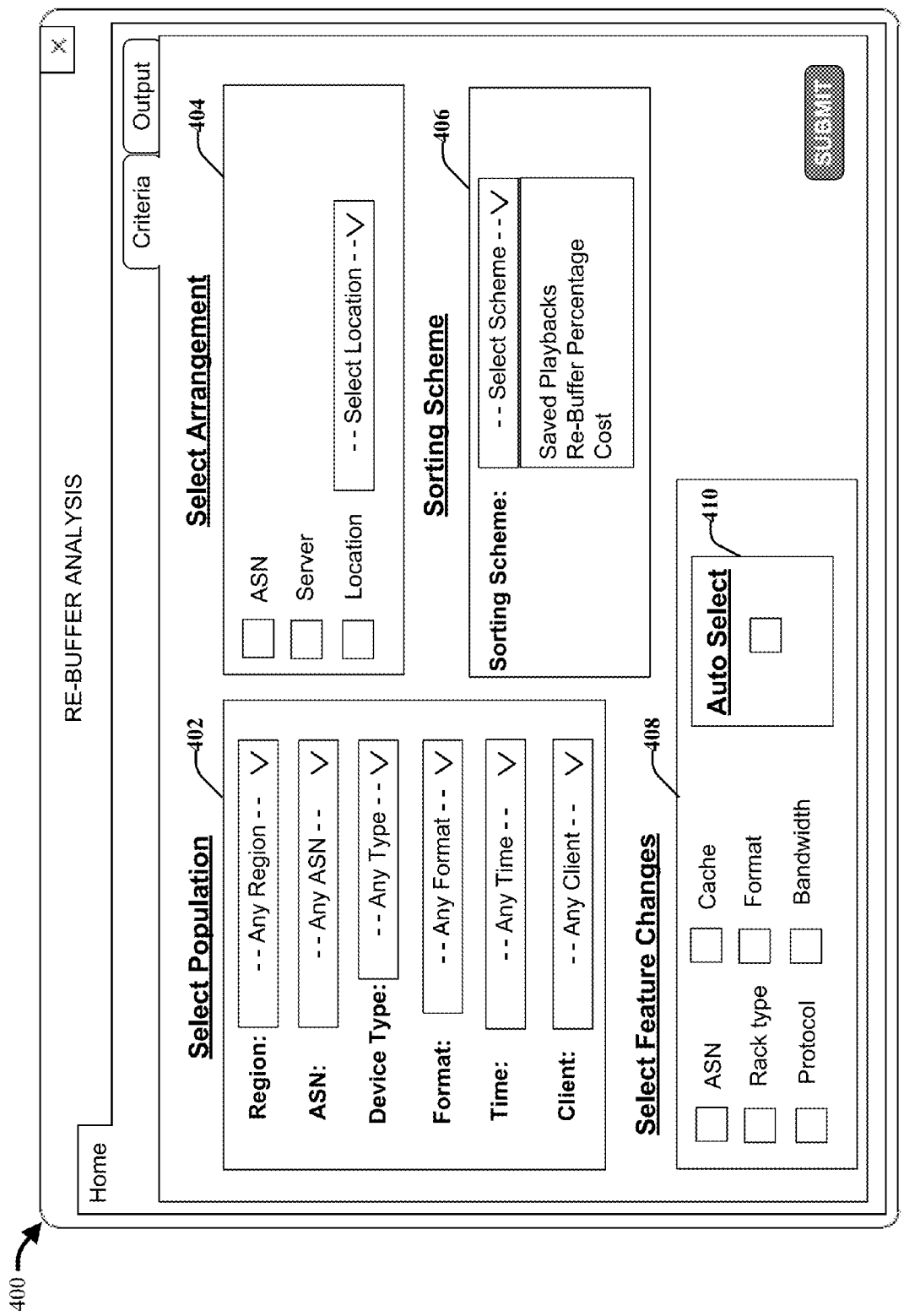
FIG. 4 presents an example user interface for evaluating streaming video delivery problems in accordance with various aspects and embodiments described herein.

FIG. 4 presents an example graphical user interface 400 in accordance with various aspects and embodiments described herein. Interface 400 provides various data input/selection categories that allow a user to select/enter criteria in association with querying a change impact table generated by modeling component 202 and generating reports that evaluate possible changes to quality features associated with streaming media provider that contribute to re-buffer. In section 402, a user can select a population of users or subset of playbacks to evaluate. For example, the population can be restricted by a particular region (e.g., where a region can be divided by various geographical areas such as continents, countries, states, cities, towns, sectors, etc.). The population can also be restricted by autonomous system number (ASN), (e.g., wherein the ASN identifies a particular ISP and/or an organization with independent connections to multiple networks, that adhere to a single and clearly defined routing policy), device type (e.g., mobile device vs. stationary device, mobile device having a particular operating system, etc.), format (e.g., video resolution), time (e.g., morning, afternoon, evening, etc.), and client (e.g., browser, native application, etc.).

Section 404 allows a user to select an arrangement that determines how the data of a query or report is to be arranged. In an aspect, section 404 can receive only one selected input category. For example, the category selected in section 404 can identify the row headers/identifiers for a table based report. In an aspect, the fields displayed and/or offered for selection in section 404 can be dependent on those categories selected in section 402. Section 406 provides for selection of a sorting scheme in associated with a ranked report. For example, using section 406, a user can select to sort results of a report based on ranked number of saved playbacks, ranked re-buffer percentage, or ranked costs associated with the changes.

Section 408 allows for input regarding quality feature changes to evaluate via a report. In an aspect, section 408 can allow a user to select one or more quality features associated with the subset of the data points represented by the selected population to apply changes to. For example, using section 408, a user can choose to evaluate changes to at least one of: ASN, rack type, protocol, cache, format, or bandwidth. In an aspect, based on the features selected in section 408 modeling component 202 can determine what feature values to change. For instance, a user can request a report that evaluates changing rack type on a particular subset of data points and modeling component 202 can choose the particular changes to the rack type (e.g., modeling component 202 can determine rack type to be changed from A to B) based on those changes that have the greatest impact on a request aspect, (e.g., re-buffer probability, cost, etc.). In another aspect, the particular feature categories included in section 408 can further include drop down menus with feature values to select to change. According to this aspect, the feature values offered in the drop down menu can be dependent on the population selected in section 402.

Still in yet another aspect, rather than selecting specific feature changes to evaluate for a particular population, a user can employ the auto select feature 410. According to this aspect, in response to selection of the auto select feature 410, modeling component 202 can choose the optimal feature(s) and feature values to change based on the population that provides for the greatest impact on the selected sorting scheme. It should be appreciated that the various input/selection categories and criteria associated therewith provided by interface 400 are merely exemplary and not intended to limit the scope of the subject disclosure.

FIG. 5 presents an example output report 500 capable of being generated by report component 304 in association with a query/report requested via interface 400, in accordance with aspects and embodiments described herein. Report 500 shows the effect of changing rack type for various ASNs. The report is requested to encompass users/playback impacted throughout the whole world. The rows of report 500 are arranged by ASN. Column 502 identifies the type of feature change (e.g., change rack type) applied. Columns 504 identify the particular feature value change applied (e.g., from EC to XT, where EC can correspond to a first rack type such as a cache near the edge of the CDN's network and XT can correspond to a second rack type such as a cache within the client's network). Column 506 identifies the total count of playbacks associated with the particular ASN in a single day. Column 508 identifies the number of re-buffer playbacks out of the total count of playbacks pre-change. Column 510 identifies the percentage of re-buffer playbacks out of the total count of playbacks pre-change. Column 512 identifies the percentage of re-buffer playbacks out of the total count of playbacks post-change, and column 514 identifies the number of re-buffer playbacks (column 508) that would have been saved from re-buffering (e.g., the number of playbacks by which column 508 would have decreased) in response to application of the change.

The various rows of table 500 are further sorted or ranked in descending order based on number of playbacks saved. For example the row corresponding to changing the rack type for ASN 146 from EC to XT is ranked first because the number of playbacks saved is the highest (e.g., 861,829) among the sample while the row corresponding to changing the rack type for ASN 1789 from EC to XP is ranked last because the number of playbacks saved is the lowest (e.g., 232,117) among the sample. Accordingly, by examining table 500, a user (or recommendation component 206), could recommend changing the rack type for ASN 146 from EC to EX over changing the rack type for ASN 1789 from EC to XP.

Figure 6:
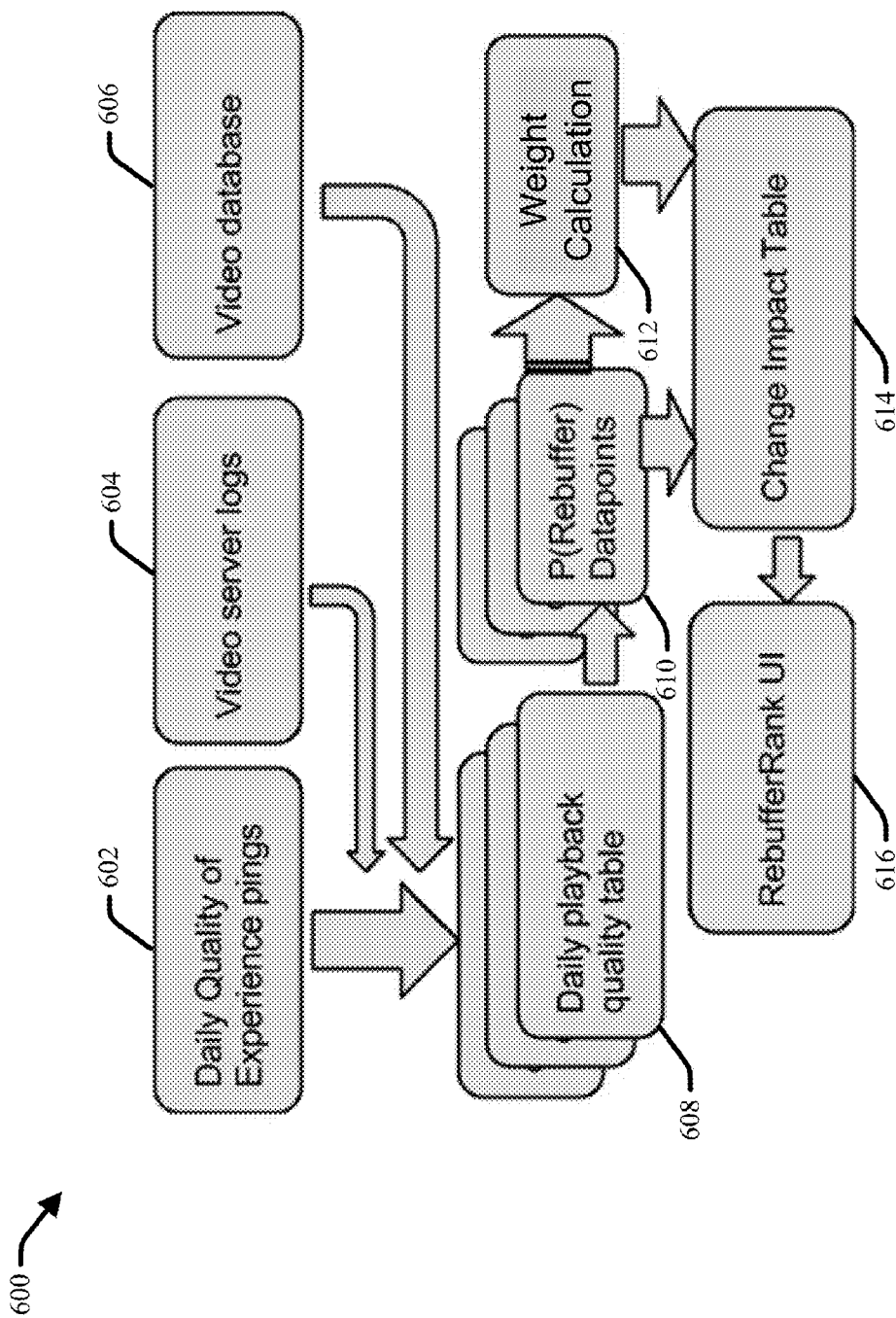
FIG. 6 present an example flow diagram for evaluating streaming video delivery problems in accordance with various aspects and embodiments described herein.

FIG. 6 presents a diagram of a high level flow diagram of an example pipeline 600 for identifying and evaluating streaming media delivery issues that contribute to re-buffering, in accordance with various aspects and embodiments described herein, in accordance with various aspects and embodiments described herein. Repetitive description of like elements employed in respective embodiments of systems and methods described herein is omitted for sake of brevity.

Pipeline 600 receives data inputs from client side quality logs and server logs as inputs regarding various playback events and outputs a ranked list of recommendations for network features to change that reduce the number of re-buffers associated with the system. In accordance with pipeline 600 input data can be received from three sources, including daily quality of experience pings 602, video server logs 604, and video data information 606. Daily quality of experience pings 602 can include data received from clients in response to pining of the video play associated with a playback event. This information can include but is not limited to: an identifier for the playback event, the number of re-buffers associated therewith, the type of client device, operating system of the client device, the client application employed to execute the playback experience, and/or the video format. Video server logs 604 can include information regarding with server side hardware, CDN flow and protocol associated with servicing each playback experience reported or pinged form a client device video player. Video database information 606 can provide addition information about the particular video associated with a playback experience, such as duration, format popularity, availability, etc.

At 608, these inputs are organized into a daily playback quality table. The daily quality playback table can associate each playback experience that occurred during a daily period (e.g., or any other set time frame) with information identifying re-buffer events associated with the playback experience and features related to the quality of the playback experience that may have impacted the re-buffer events (if any re-buffer events did in fact occur for the playback experience). At 610, probabilities of re-buffer (P(Rebuffer)), are determined for different feature combinations by applying a MapReduce function against the daily playback quality table. At 612, these data points, that respectively correspond to a probability of re-buffer associated with a particular combination of features, are then subjected to a machine learning analysis (e.g., a logistic regression function) to determine weights for each of the individual features and some feature combinations. These weights reflect the manner (e.g., positively or negatively) and degree (how positively or how negatively) to which the individual features and the feature combinations contribute to re-buffer.

At 614, a change impact table is generated that relates how the probabilities of re-buffer for the original data points, (that respectively correspond to a particular combination of features), are impacted based on various changes to the features as a function of the respective weights associated with the features and feature changes. At 616, a re-buffer rank user interface is generated that allows a user to query the change impact table to evaluate how certain feature chances can influence re-buffer.

Figure 7:
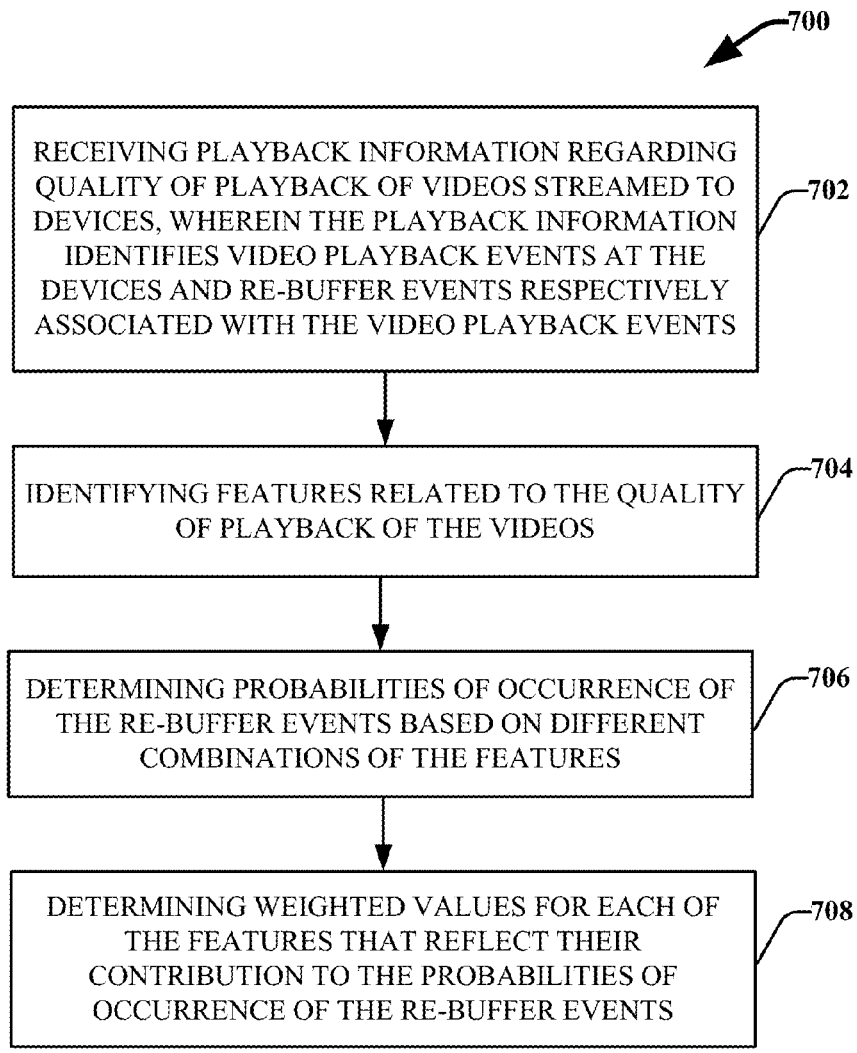
FIG. 7 presents an example method for evaluating streaming video delivery problems in accordance with various aspects and embodiments described herein.
Figure 8:
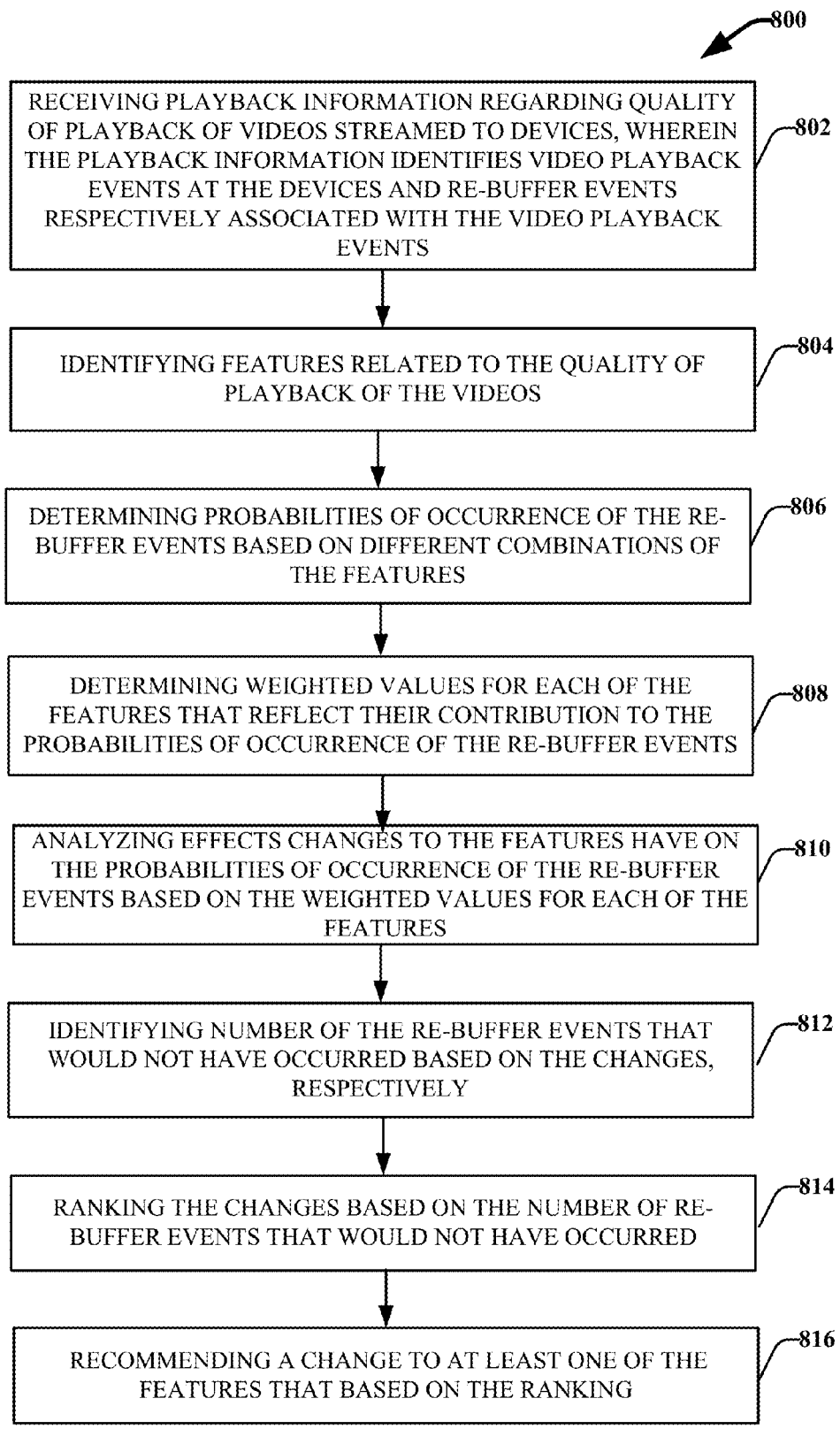
FIG. 8 presents another example method for evaluating streaming video delivery problems in accordance with various aspects and embodiments described herein.

In view of the example systems and/or devices described herein, example methods that can be implemented in accordance with the disclosed subject matter can be further appreciated with reference to flowcharts in FIGS. 7-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for identifying and scoring video infrastructure delivery problems using machine learning, in accordance with various aspects and embodiments described herein. At 702, playback information is received regarding quality of playback of videos streamed to devices (e.g., by media streaming provider 110). The playback information identifies video playback events at the devices and at least re-buffer events respectively associated with the video playback events. At 704, features related to the quality of playback of the videos are identified (e.g., via quality component 106). At 706, probabilities of occurrence of the re-buffer events are determined based on different combinations of the features (e.g., via analysis component 108), and at 708, weighted values are determined for each of the features that reflect their contribution to the probabilities of occurrence of the re-buffer events (e.g., via analysis component 108).

FIG. 8 illustrates a flow chart of an example method 800 for identifying and scoring video infrastructure delivery problems using machine learning, in accordance with various aspects and embodiments described herein. At 802, playback information is received regarding quality of playback of videos streamed to devices (e.g., by media streaming provider 110). The playback information identifies video playback events at the devices and at least re-buffer events respectively associated with the video playback events. At 804, features related to the quality of playback of the videos are identified (e.g., via quality component 106). At 806, probabilities of occurrence of the re-buffer events are determined based on different combinations of the features (e.g., via analysis component 108), and at 808, weighted values are determined for each of the features that reflect their contribution to the probabilities of occurrence of the re-buffer events (e.g., via analysis component 108).

At 810, effects changes to the features have on the probabilities of occurrence of the re-buffer events are analyzed based on the weighted values for each of the features (e.g., via modeling component 202). At 812, the number of the re-buffer events that would not have occurred based on the changes, respectively, are identified, based on the effects the changes to the features have on the probabilities of occurrence of the re-buffer events (e.g., by modeling component 202). At 814, the changes are ranked based on the number of re-buffer events that would not have occurred (e.g., by ranking component 204), and at 816, at least one of the changes is recommended based on its ranking (e.g., by recommendation component 206).

Example Operating Environments

The illustrated aspects of the disclosure may also be practiced in distributed computing environments where certain tasks are performed by a plurality of processing/computing devices that are linked through a communications network. In a distributed computing environment, program modules can be located in both local and remote memory storage devices. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
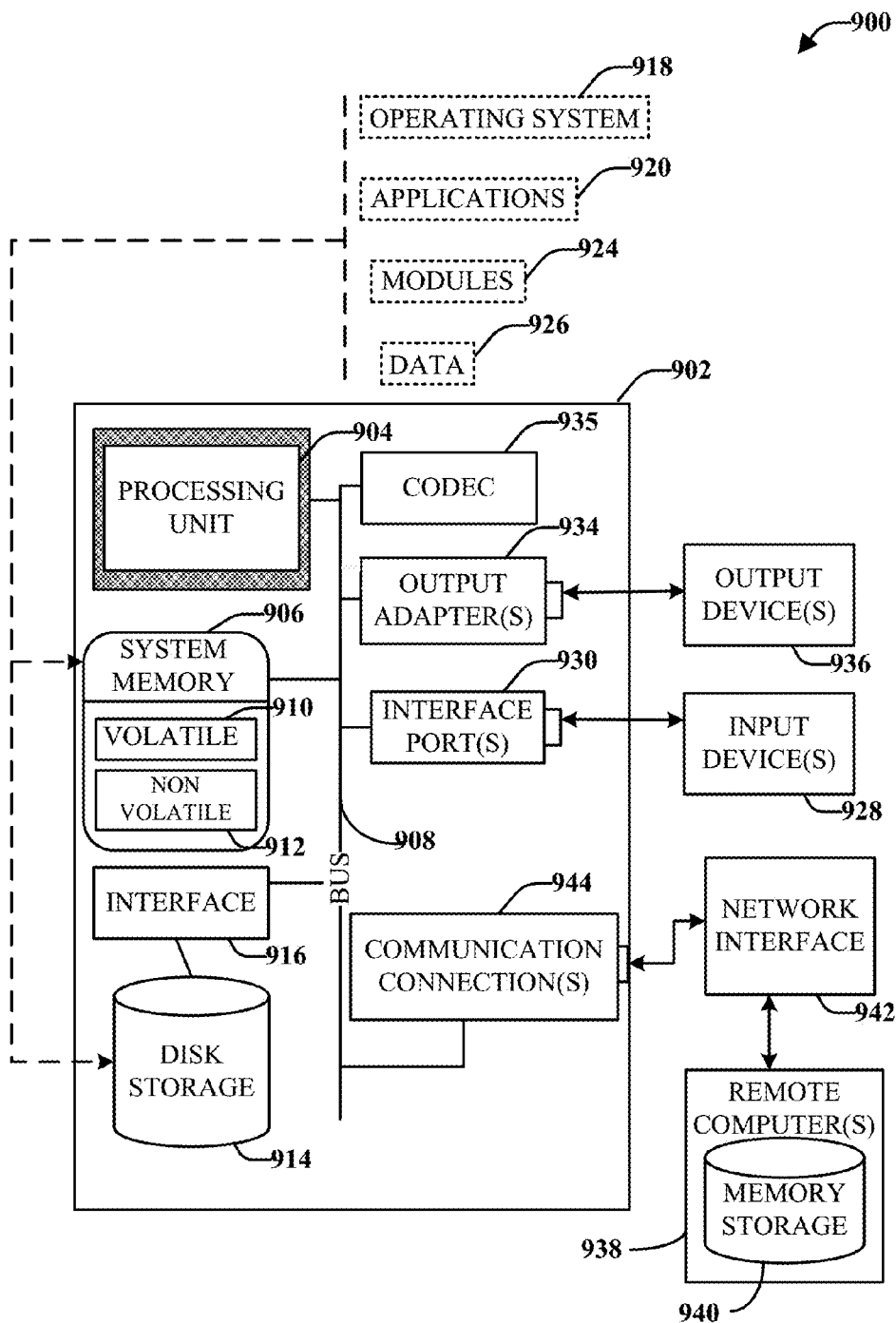
FIG. 9 is a schematic block diagram illustrating a suitable operating environment in accordance with various aspects and embodiments.

With reference to FIG. 9, a suitable processing system 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable processing system 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s). Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
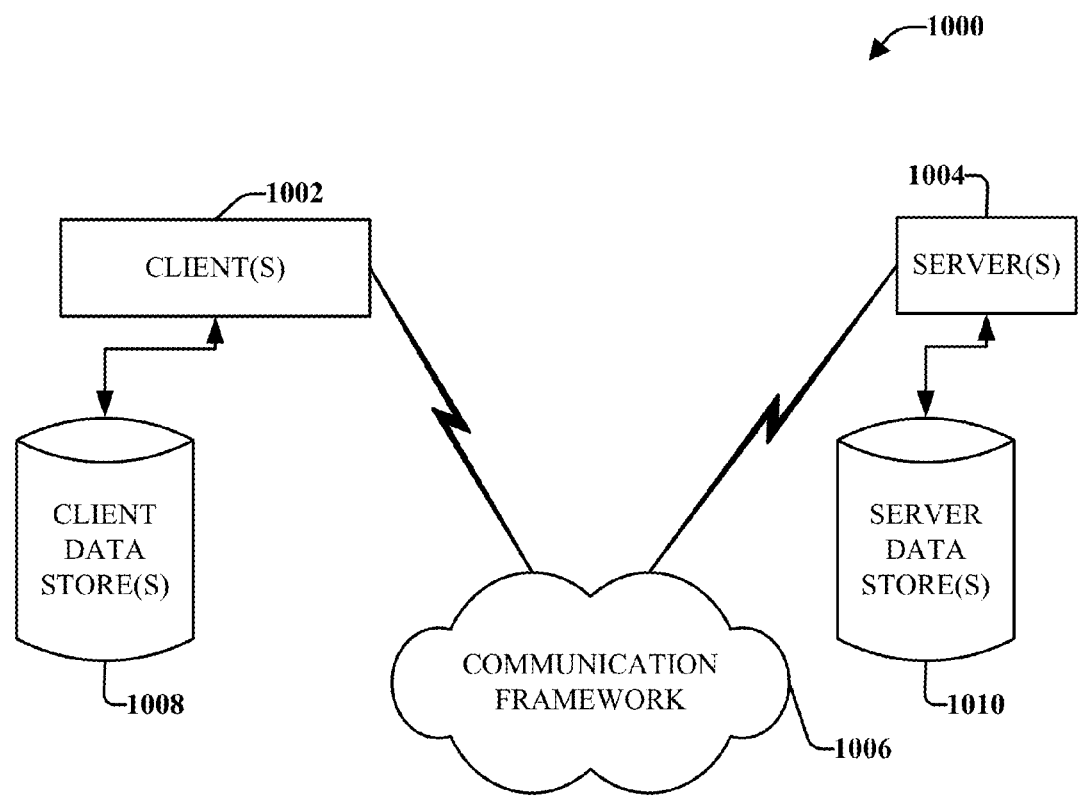
FIG. 10 is a schematic block diagram of a sample-computing environment in accordance with various aspects and embodiments.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory that stores computer executable instructions;
    a processor that executes the computer executable instructions stored in the memory to perform operations comprising:
        receiving playback information regarding videos streamed by the system to devices, wherein the playback information identifies playback events at the devices and re-buffer events respectively associated with the playback events;
        identifying features related to quality of the playback events at the devices based on the playback information;
        identifying a plurality of different combinations of the identified features;
        determining for each of the plurality of different combinations, a probability of a re-buffer event based on playback events and re-buffer events associated with the combination;
        determining a weighted value for each of the identified features based on the determined probabilities, the weighted value determined for each of the identified features indicating a degree to which the identified feature contributes to a re-buffer event;
        determining a recommendation of changes to one or more features from the identified features based on the weighted value determined for each of the one or more features, the recommendation for reducing a probability of a re-buffer event; and
        transmitting, by the computer system, the recommendation to a client device.

2. The system of claim 1, wherein the processor further performs operations comprising:
    analyzing effects changes to the identified features have on a probability of a re-buffer event based on the weighted values for each of the identified features.

3. The system of claim 2, wherein analyzing the effects comprises identifying a number of re-buffer events that would not have occurred based on the changes and rank the changes based on the number of the re-buffer events that would not have occurred.

4. The system of claim 1, wherein determining a recommendation of changes comprises determining to recommend one of the changes to the one or more features that results in a lowest probability of occurrence of a re-buffer event.

5. The system of claim 2, wherein the processor further performs operations comprising generating a report that identifies the effects the changes to the identified features have on the probability of a re-buffer event.

6. The system of claim 1, wherein the weighted value for each of the identified features is determined by applying machine learning to the determined probabilities.

7. The system of claim 1, wherein the weighted value for each of the identified features is determined by applying a logistic regression function to the determined probabilities.

8. The system of claim 1, wherein the features related to the quality of the playback events include at least one of: internet protocol (IP) addresses respectively associated with each of the playback events, internet service providers (ISPs) respectively associated with each of the playback events, racks respectively associated with each of the playback events, type of the racks, protocols employed for each of the playback events, video format of the videos respectively associated with each of the playback events.

9. The system of claim 1, wherein the features related to the quality of the playback events include at least one of, type of the devices or operating system of the devices.

10. A method comprising:
receiving, by a computer system, playback information regarding quality of playback of videos streamed by a media streaming system to devices, wherein the playback information identifies playback events at the devices and re-buffer events respectively associated with the playback events;
identifying, by the computer system, features related to the quality of playback of the videos based on the playback information;
identifying, by the computer system, a plurality of different combinations of the identified features;
determining, by the computer system for each of the plurality of different combinations, a probability of a re-buffer event based on playback events and re-buffer events associated with the combination;
determining, by the computer system, a weighted value for each of the identified features based on the determined probabilities, the weighted value determined for each of the identified features indicating a degree to which the identified feature contributes to a re-buffer event;
determining, by the computer system, a recommendation of changes to one or more features from the identified features based on the weighted value determined for each of the one or more features, the recommendation for reducing a probability of a re-buffer event; and
transmitting, by the computer system, the recommendation to a client device.

11. The method of claim 10, further comprising:
analyzing effects changes to the identified features have on a probability of a re-buffer event based on the weighted values for each of the identified features.

12. The method of claim 11, wherein the analyzing the effects comprises:
identifying a number of re-buffer events that would not have occurred based on the changes, respectively; and
ranking the changes based on the number of re-buffer events that would not have occurred.

13. The method of claim 11, wherein determining a recommendation of changes comprises determining to recommend one of the changes to the one or more features that results in a lowest probability of occurrence of a re-buffer event.

14. The method of claim 10, wherein the weighted value for each of the identified features is determined by applying machine learning that includes a logistic regression function to the determined probabilities.

15. The method of claim 10, wherein the identified features related to the quality of the playback events include at least one of: internet protocol (IP) addresses respectively associated with each of the playback events, internet service providers (ISPs) respectively associated with each of the playback events, racks respectively associated with each of the playback events, type of the racks, protocols employed for each of the playback events, video format of the videos respectively associated with each of the playback events, type of the devices or operating system of the devices.

16. A non-transitory computer-readable storage medium comprising computer-readable instructions that, in response to execution, cause a computing system to perform operations, comprising:
receiving playback information regarding quality of playback of videos streamed by the system to devices, wherein the playback information identifies playback events at the devices and re-buffer events respectively associated with the playback events;
identifying features related to the quality of playback of the videos based on the playback information;
identifying a plurality of different combinations of the identified features;
determining, for each of the plurality of different combinations, a probability of a re-buffer event based on playback events and re-buffer events associated with the combination;
determining a weighted value for each of the identified features based on the determined probabilities, the weighted value determined for each of the identified features indicating a degree to which the identified feature contributes to a re-buffer event;
determining a recommendation of changes to one or more features from the identified features based on the weighted value determined for each of the one or more features, the recommendation for reducing a probability of a re-buffer event; and
transmitting the recommendation to a client device.

17. The non-transitory computer-readable storage medium of claim 16, the operations further comprising:
analyzing effects changes to the identified features have on a probability of a re-buffer event based on the weighted values for each of the identified features.

* * * * *